United States Patent
Rakshit

(10) Patent No.: US 9,188,447 B2
(45) Date of Patent: *Nov. 17, 2015

(54) PHYSICAL OBJECT SEARCH

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,395

(22) Filed: Jun. 17, 2014

(65) Prior Publication Data

US 2014/0297179 A1    Oct. 2, 2014

Related U.S. Application Data

(63) Continuation of application No. 13/476,067, filed on May 21, 2012, now Pat. No. 8,825,368.

(51) Int. Cl.
G01C 21/00   (2006.01)
G01C 21/12   (2006.01)
G01C 21/20   (2006.01)
(Continued)

(52) U.S. Cl.
CPC ............ *G01C 21/12* (2013.01); *G01C 21/20* (2013.01); *G01C 21/3438* (2013.01); *G01C 21/3623* (2013.01)

(58) Field of Classification Search
CPC .... G01C 21/3438; G01C 21/12; G01C 21/20; G01C 21/3623; G06K 9/00785; G08B 13/19608
USPC .................................................. 701/302, 400
See application file for complete search history.

(56) References Cited

U.S. PATENT DOCUMENTS 7,099,774 B2   8/2006   King et al.
7,138,914 B2   11/2006  Culpepper et al.
(Continued)

FOREIGN PATENT DOCUMENTS

JP   2007206785   8/2007
JP   2007305155   11/2007

OTHER PUBLICATIONS

Hameed et al., Car Monitoring, Alerting and Tracking Model, Enhancement with Mobility and Database Facilities, International Conference on Computer and Communication Engineering (ICCCE 2010), May 11-13, 2010, 5 pages.
(Continued)

*Primary Examiner* — Behrang Badii
*Assistant Examiner* — David Testardi
(74) *Attorney, Agent, or Firm* — Schmeiser, Olsen & Watts; John Pivnichny

(57) ABSTRACT

A method and system for searching for items is provided. The method includes receiving, from a user, description data describing search requirements associated with a requested physical object to be located. Locations of the user are monitored and a request to locate the physical object is transmitted to video data retrieval devices. In response, video data associated with associated physical objects and location data for associated locations are retrieved. Distances and relative velocities between current locations of the user and each location of each physical object are calculated. In response, recommendations associated with traveling to view each physical object are generated and presented to the user.

18 Claims, 3 Drawing Sheets

(51) Int. Cl.
*G01C 21/34* (2006.01)
*G01C 21/36* (2006.01)

(56) References Cited

U.S. PATENT DOCUMENTS

| | | | |
|---|---|---|---|
| 7,184,885 B2 | 2/2007 | Watanabe | |
| 7,627,199 B2 | 12/2009 | Sato et al. | |
| 7,746,378 B2 | 6/2010 | Shu et al. | |
| 7,818,016 B2 | 10/2010 | Ahn | |
| 7,940,172 B2 | 5/2011 | Bell et al. | |
| 7,986,230 B2 | 7/2011 | Gabara | |
| 8,160,371 B2 | 4/2012 | Ma et al. | |
| 8,212,668 B2 | 7/2012 | Gabara | |
| 8,410,927 B2 | 4/2013 | Gabara | |
| 8,463,537 B2 | 6/2013 | Mueller et al. | |
| 8,825,368 B2 | 9/2014 | Rakshit | |
| 2005/0073436 A1 | 4/2005 | Negreiro | |
| 2005/0162515 A1* | 7/2005 | Venetianer et al. | 348/143 |
| 2006/0114325 A1* | 6/2006 | von Hausen | 348/144 |
| 2006/0200307 A1 | 9/2006 | Riess | |
| 2006/0265294 A1 | 11/2006 | De Sylva | |
| 2006/0291695 A1* | 12/2006 | Lipton et al. | 382/103 |
| 2007/0127774 A1* | 6/2007 | Zhang et al. | 382/103 |
| 2008/0268876 A1 | 10/2008 | Gelfand et al. | |
| 2009/0175500 A1* | 7/2009 | Kizuki et al. | 382/103 |
| 2009/0322881 A1 | 12/2009 | Shu et al. | |
| 2010/0060455 A1* | 3/2010 | Frabasile | 340/572.4 |
| 2010/0106707 A1 | 4/2010 | Brown et al. | |
| 2010/0260426 A1 | 10/2010 | Huang et al. | |
| 2011/0074953 A1 | 3/2011 | Rauscher et al. | |
| 2011/0218992 A1 | 9/2011 | Waldman et al. | |
| 2012/0030208 A1 | 2/2012 | Brown et al. | |
| 2013/0061147 A1 | 3/2013 | Beaurepaire | |
| 2013/0307979 A1* | 11/2013 | Chen et al. | 348/148 |
| 2013/0311079 A1 | 11/2013 | Rakshit | |

OTHER PUBLICATIONS

Mierzwinski et al., Video and Sensor Data Integration in a Service-Oriented Surveillance System, Scalable Computing: Practice and Experience, vol. 12, No. 1, pp. 93-103, http://www.scpe.org, (2001).

JPO machine translation of JP2007-206785 (original JP document published Aug. 16, 2007).

Diagnekov, Louka; Video-based Car Surveillance: License Plate, Make, and Model Recognition; University of California San Diego Master's Theses; 2005; 93 pages.

Hampapur, Arun et al.; Searching surveillance video; IEEE Conference on Advanced Video and Signal Based Surveillance; AVSS 2007, Sep. 5-7, 2007; pp. 75-80.

Klein, Allison et al.; License plate readers: a useful tool for police comes with privacy concerns; The Washington Post; Nov. 19, 2011; 8 pages.

Motorola brochure, Automatic License Plate Recognition; Solution Brief; 2010; 4 pages; dowloaded from http://www.daywireless.com/downloads/motorola/solutions_brief/motorola_alpr.pdf.

NDI Recognition Systems brochure; ANPR Information Pack, NDI Recognition Systems; Google Date Feb. 21, 2011, 11 pages; downloaded from http://mediabrintex.com/Occurrence/49/Brochure/989/brochure.pdf.

Tian Ying-Li; Event detection, query, and retrieval for video surveillance; Chapter 15 of Artificial Intelligence for Maximizing Content Based Image Retrieval, published by IGI Global; Jan. 2009; 30 pages; downloaded from http://www.andrewsenior.com/papers/TianAIMCBIR08.pdf.

List of IBM Patents or Patent Applications Treated as Related; Jun. 17, 2014; 1 page.

U.S. Appl. No. 13/476,067, filed May 21, 2012; Confirmation No. 8006.

Office Action (Mail Date Jan. 21, 2014) for U.S. Appl. No. 13/476,067, filed May 21, 2012; Confirmation No. 8006.

Amendment filed Mar. 21, 2014 in response to Office Action (Mail Date Jan. 21, 2014) for U.S. Appl. No. 13/476,067, filed May 21, 2012; Confirmation No. 8006.

Notice of Allowance (Mail Date Apr. 22, 2014) for U.S. Appl. No. 13/476,067, filed May 21, 2012; Confirmation No. 8006.

* cited by examiner

PHYSICAL OBJECT SEARCH

This application is a continuation application claiming priority to Ser. No. 13/476,067 filed May 21, 2012, now U.S. Pat. No. 8,825,368, issued Sep. 2, 2014.

FIELD

The present invention relates to a method and associated system for performing a search for a physical object.

BACKGROUND

Locating items typically comprises an inaccurate process with little flexibility. Performing a search process may include a complicated process that may be time consuming and require a large amount of resources. Accordingly, there exists a need in the art to overcome at least some of the deficiencies and limitations described herein.

SUMMARY

The present invention provides a method comprising: receiving, by a computer processor of a remote computing system from a mobile user via a mobile device, description data describing search requirements associated with a requested physical object to be located; generating, by the computer processor, a request associated with a real time search for the requested physical object associated with the description data; monitoring, by the computer processor, locations of the mobile user; transmitting, by the computer processor, the request to a plurality of video data retrieval devices, wherein each video data retrieval device is located in a different location; receiving, by the computer processor in response to the request from the plurality of video data retrieval devices, video data associated with a plurality of physical objects associated with the requested physical object; receiving, by the computer processor, location data associated with a location for each physical object of the plurality of physical objects; calculating, by the computer processor, distances between current locations of the locations of the mobile user and each the location of each physical object; calculating, by the computer processor, a relative velocity between the mobile user and each physical object; generating, by the computer processor based on each distance of the distances and each the relative velocity, recommendations associated with traveling to view each physical object; and presenting, by the computer processor to the mobile user, the recommendations.

The present invention provides a computer program product, comprising a computer readable storage device storing a computer readable program code, the computer readable program code comprising an algorithm that when executed by a computer processor of a remote computing system implements a method, the method comprising: receiving, by the computer processor from a mobile user via a mobile device, description data describing search requirements associated with a requested physical object to be located; generating, by the computer processor, a request associated with a real time search for the requested physical object associated with the description data; monitoring, by the computer processor, locations of the mobile user; transmitting, by the computer processor, the request to a plurality of video data retrieval devices, wherein each video data retrieval device is located in a different location; receiving, by the computer processor in response to the request from the plurality of video data retrieval devices, video data associated with a plurality of physical objects associated with the requested physical object; receiving, by the computer processor, location data associated with a location for each physical object of the plurality of physical objects; calculating, by the computer processor, distances between current locations of the locations of the mobile user and each the location of each physical object; calculating, by the computer processor, a relative velocity between the mobile user and each physical object; generating, by the computer processor based on each distance of the distances and each the relative velocity, recommendations associated with traveling to view each physical object; and presenting, by the computer processor to the mobile user, the recommendations.

The present invention provides a computer system comprising a computer processor coupled to a computer-readable memory unit, the memory unit comprising instructions that when executed by the computer processor of a remote computing system implements a method comprising: receiving, by the computer processor from a mobile user via a mobile device, description data describing search requirements associated with a requested physical object to be located; generating, by the computer processor, a request associated with a real time search for the requested physical object associated with the description data; monitoring, by the computer processor, locations of the mobile user; transmitting, by the computer processor, the request to a plurality of video data retrieval devices, wherein each video data retrieval device is located in a different location; receiving, by the computer processor in response to the request from the plurality of video data retrieval devices, video data associated with a plurality of physical objects associated with the requested physical object; receiving, by the computer processor, location data associated with a location for each physical object of the plurality of physical objects; calculating, by the computer processor, distances between current locations of the locations of the mobile user and each the location of each physical object; calculating, by the computer processor, a relative velocity between the mobile user and each physical object; generating, by the computer processor based on each distance of the distances and each the relative velocity, recommendations associated with traveling to view each physical object; and presenting, by the computer processor to the mobile user, the recommendations.

The present invention advantageously provides a simple method and associated system capable of locating objects.

DETAILED DESCRIPTION

Figure 1:
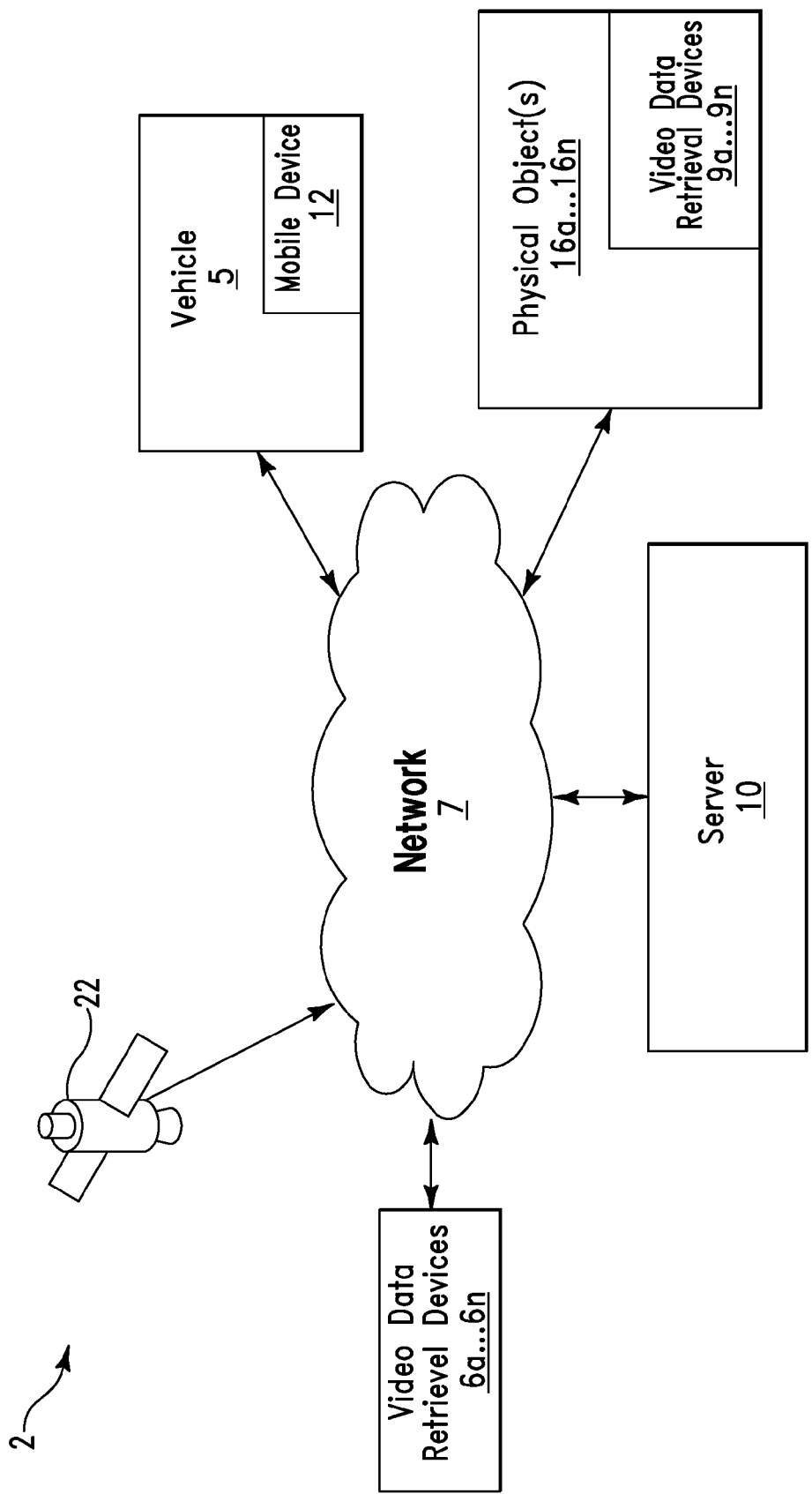
FIG. 1 illustrates a system for enabling a process for performing a search for a physical object, in accordance with embodiments of the present invention.

FIG. 1 illustrates a system 2 for enabling a process for performing a search for a physical object, in accordance with embodiments of the present invention. A physical object is defined herein any type of object that a user submits a request to locate. For example, a physical object may comprise, inter alia, a vehicle, a landmark, etc. System 2 enable a method for generating a global positioning satellite (GPS) based advance alert and/or recommendation process in accordance with multiple physical object search requirements as follows:

A user may define physical object search criteria (e.g., via an image, video, text, etc) on a GPS enabled mobile device prior to traveling. In response, the GPS enabled mobile device may transmit the physical object search criteria to a remote server (or computing system) via GPS satellite. The remote server continuously collects data from various data sources (e.g., CCTV cameras, vehicle mounted cameras, etc) and based on the user's current location and target location, the collected data is compared to the search criteria. In response, the GPS enabled mobile device alerts the user (of located physical bodies in accordance with the search criteria) and may recommend changing a route or speed of a vehicle to view the located physical bodies. For example, a user may want to locate a specified automobile (e.g., a specified make, model, and color associated with an automobile advertisement) in order to view the automobile to determine if he/she may want to visit a dealership to purchase this type of automobile. The user may transmit search criteria (e.g., a picture and/or a text description describing the specified make, model, and color of the automobile) via a mobile phone to a server and in response, the server will transmit a command (associated with the search criteria) to multiple video retrieval devices (e.g., multiple cameras (e.g., traffic cams, security cameras, etc) located within a specified distance from the user). In response, the multiple video retrieval devices transmit images (and locations) of various automobiles on various roadways back to the mobile device in accordance with the search criteria.

System 2 comprises a mobile device 12 (e.g., within a vehicle 5) in communication with a (remote) server 10 and video retrieval devices 6a . . . 6n via a network 7 and/or a satellite 22 in order to locate physical objects 16a . . . 16n in accordance with specified search parameters. Additionally or alternatively, mobile device 12 may be in communication with video retrieval devices 9a . . . 9n located within physical objects 16a . . . 16n. Vehicle 5 may comprise any type of vehicle including, inter alia, an automobile, an aircraft, a boat, a motorcycle, a bicycle, etc. Mobile device 12 may comprise any type of mobile device including, inter alia, a cellular telephone, a PDA, a computer, etc. Video retrieval devices 6a . . . 6n and 9a . . . 9n may comprise any type of video retrieval devices including, inter alia, a digital camera, a video camera, etc. Network 7 may comprise any type of network including, inter alia, the Internet, a satellite network, a WAN, etc.

System 2 enables a process for using a GPS enabled mobile device (e.g., mobile device 12) to define a search requirement (to locate a physical object) using AND, OR, etc clauses. A (physical object) search criteria may be defined by uploading one or more images, videos, or text descriptions describing the physical object. Cameras installed at different locations (e.g., CCTV vehicle mounted cameras, etc) may capture photographs (of the physical object) in a real time basis. A GPS system may profile the search criteria with collected video data (e.g., retrieved from the CCTV or vehicle mounted cameras) based on a current location and predicted target location of the user. Accordingly the user will be alerted in advance if any such required search criteria are located resulting in the user being alerted and/or presented with a change in route or speed to view the located physical object. The following example describes a data retrieval process associated with retrieving video data associated with a physical object location process:

A user travelling to a specified location may define physical object search requirements in a mobile device (e.g., mobile device 12). The user may upload an image/video/text to define the search requirements. The (GPS enabled) mobile device will transmit the search requirements to a remote server (e.g., remote server 10) via a GPS satellite (e.g., satellite 22) and/or a network (e.g., network 7). The remote server transmits requests (in accordance with the search requirements) to video data retrieval devices (installed at several locations) and in response, the video data retrieval devices continuously capture and transmit video (comprising various images of traveling vehicles) to the remote server via the GPS Satellite. Additionally, video data retrieval devices within vehicles may continuously capture and transmit video to the remote server. The remote server continuously gathers the video data from all video data retrieval devices along with the Search requirement and a current location of the user.

The following example describes a data analysis process (associated with the retrieved video data) performed by the remote server with respect to the physical object location process:

1. Data is extracted from the image/video/text used to define the search requirements.
2. The server comprising a software application identifies a target location of the user (e.g., based on a historical pattern analysis of the user's movement) and predicts a possible route to be taken by the user.
3. The server continuously identifies a real time position of the user.
4. Data is extracted from retrieved video data (e.g., retrieved from CCTVs installed in different locations or from vehicle mounted cameras).
5. The server identifies if any required requirements (defined by the user) are located within a route (or predicted route) of the user.
6. The server calculates a relative velocity between the user (or user's vehicle) and an identified (and located) physical object (as defined by the required requirements) in a same (or alternative) route of travel. Based on the calculated relative velocity, the server determines if the physical object is moving away from the user (i.e., a distance is increasing) or moving towards the user (i.e., a distance is decreasing).
7. Based on a threshold defined by the user (e.g., a threshold may be defined by a Distance or time), the user is alerted or requested to change his/her route or speed of the vehicle.
8. Based on a distance and speed, the server calculates a possible meeting point and time associated with the physical object and the user. For example, the server may calculate and determine the following recommendations:
   A. A first physical object has been located one mile behind the user with a possible meeting time of five minutes.
   B. A second physical object has been located two miles in front of the user and therefore a speed of travel should be increased (e.g., from 20 mph to 30 mph).
   C. Change a route of travel.
9. Based on the recommendations, the user may select an option for locating the physical object.

Figure 2:
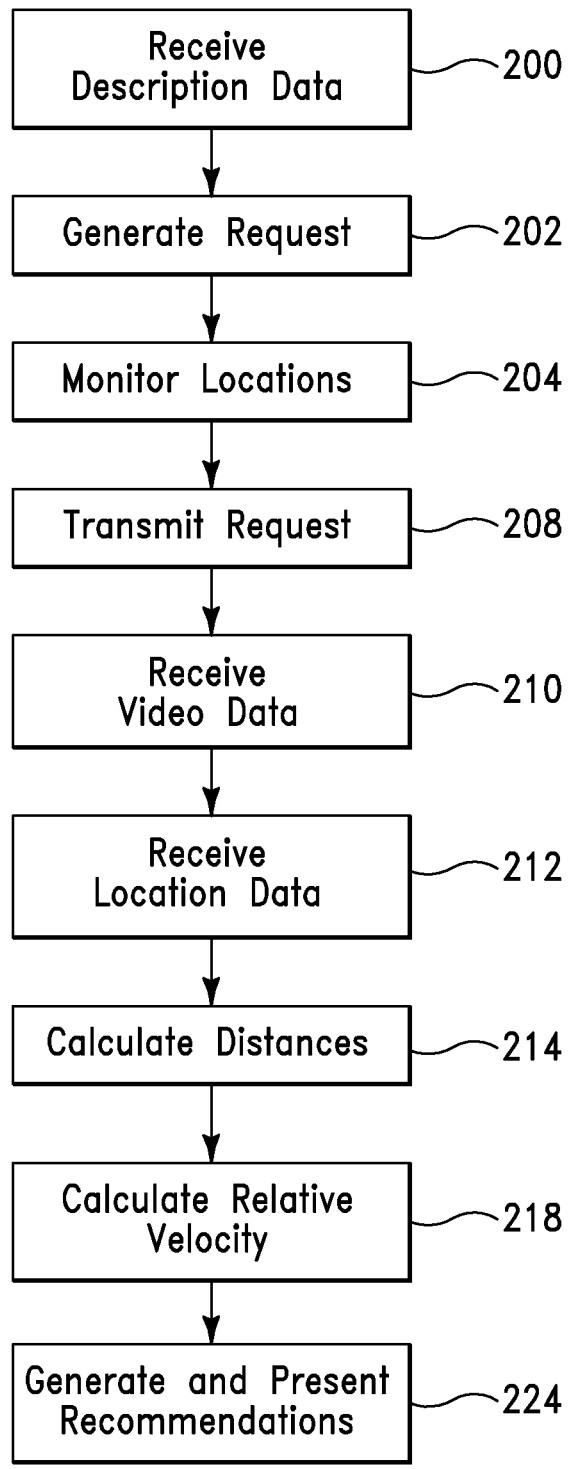
FIG. 2 illustrates an algorithm detailing a process flow enabled by the system of FIG. 1 for performing a search for a physical object, in accordance with embodiments of the present invention.

FIG. 2 illustrates an algorithm detailing a process flow enabled by system 2 of FIG. 1 for performing a search for a physical object, in accordance with embodiments of the present invention. In step 200, a computer processor (of a remote computing system) receives (from a mobile user (e.g., in an automobile) via a mobile device) description data describing search requirements associated with a requested physical object to be located. The description data may include, inter alia, video images, text descriptions, etc. In step 202, the computer processor generates a request associated with a real time search for the requested physical object associated with the description data. In step 204, the computer processor monitors locations of the mobile user. Additionally, the computer processor may receive destination data (indicating a requested destination for the mobile user) and identify a current route of travel associated with the requested destination. Alternatively, the computer processor may analyze a historic pattern of the mobile user's movement and determine (based results of the analyses) a target location associated with a destination of the mobile user. In step 208, the computer processor transmits the request (generated in step 202) to multiple video data retrieval devices in multiple different location. In step 210, the computer processor receives (in response to the request) from the multiple video data retrieval devices, video data associated with a plurality of (located) physical objects associated with the requested physical object. In step 212, the computer processor receives location data associated with a location for each physical object. In step 214, the computer processor calculates distances between current locations of the locations (of the mobile user monitored in step 204) of the mobile user and each location of each physical object. In step 218, the computer processor calculates a relative velocity between the mobile user and each physical object. Additionally, the computer processor may determine (based on each relative velocity) that a first group of physical objects are moving away from the mobile user and a second group of physical objects are moving towards the mobile user. In step 224, the computer processor generates (based on each distance and each relative velocity) recommendations associated with traveling to view each physical object. The recommendations are presented to the mobile user and may include a route change or speed change with respect to the mobile user.

Figure 3:
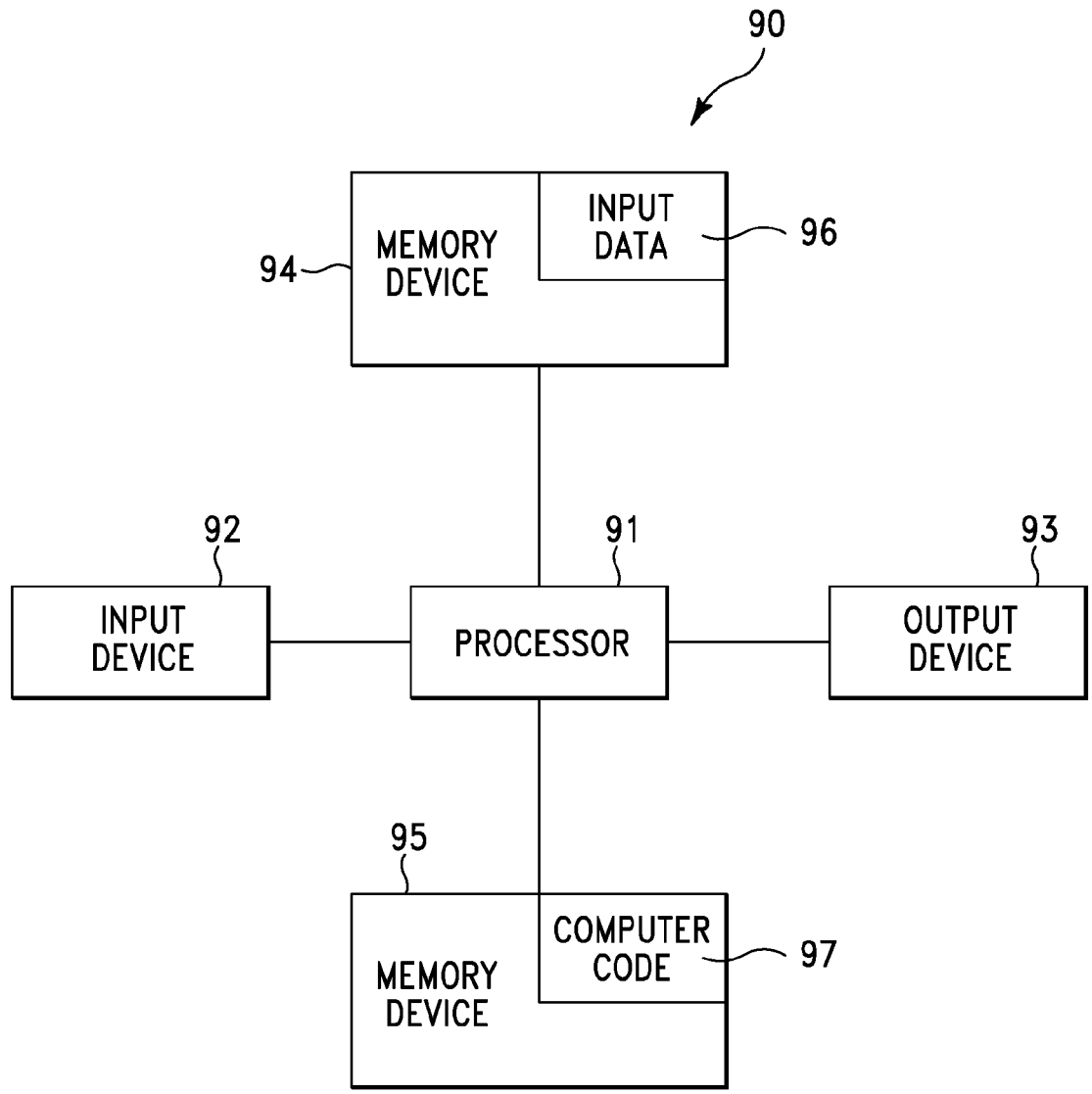
FIG. 3 illustrates a computer apparatus used by the system of FIG. 1 for performing a search for a physical object, in accordance with embodiments of the present invention.

FIG. 3 illustrates a computer apparatus 90 used by system 2 of FIG. 1 for performing a search for a physical object, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for performing a search for a physical object. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to perform a search for a physical object. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for performing a search for a physical object. In another embodiment, the invention provides a business method that performs the process steps of the invention on a subscription, advertising, and/or fee basis. That is, a service supplier, such as a Solution Integrator, could offer to perform a search for a physical object. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving, by a computer processor of a remote computing system from a mobile user via a mobile device, description data describing search requirements associated with a requested physical object to be located;
monitoring, by said computer processor in response to a real time search for said requested physical object associated with said description data, current locations of said mobile user;
transmitting, by said computer processor, said request to a plurality of video data retrieval devices, wherein each video data retrieval device is located in a different location;
receiving, by said computer processor in response to said request from said plurality of video data retrieval devices, video data associated with a plurality of physical objects associated with said requested physical object;
calculating, by said computer processor, distances between said current locations of said mobile user and each object location for each physical object of said plurality of physical objects;
calculating, by said computer processor, a relative velocity between said mobile user and each said physical object;
first determining, by said computer processor based on each said relative velocity, that a first group of physical objects of said plurality of physical objects are moving away from said mobile user;
second determining, by said computer processor based on each said relative velocity, that a second group of physical objects of said plurality of physical objects are moving towards said mobile user; and generating, by said computer processor based on said first determining, said second determining, each distance of said distances, and each said relative velocity, recommendations associated with traveling to view each said physical object, wherein said recommendations are presented to said mobile user.

2. The method of claim 1, wherein said generating said recommendations comprises:

calculating an intersection location between said mobile user and each said physical object.

3. The method of claim 2, wherein said generating said recommendations further comprises:

calculating, for said mobile user, a time of arrival to each said intersection location.

4. The method of claim 1, further comprising:

receiving, by said computer processor from said mobile user, destination data indicating a requested destination for said mobile user; and identifying, by said computer processor, a current route of travel for said mobile user, wherein said current route of travel is associated with said requested destination, wherein said generating said recommendations are further based on said destination data and said current route of travel.

5. The method of claim 1, further comprising:

analyzing, by said computer processor, a historic pattern of said mobile user's movement; and determining, by said computer processor based results of said analyzing, a target location associated with a destination of said mobile user, wherein said generating said recommendations are further based on said target location.

6. The method of claim 1, wherein said generating said recommendations comprises:

determining a route change for said mobile user.

7. The method of claim 1, wherein said generating said recommendations comprises:

determining a change to a speed of travel for said mobile user.

8. The method of claim 1, wherein said description data comprises video images.

9. The method of claim 1, wherein said description data comprises text data.

10. A process for supporting computing infrastructure, the process comprising providing at least one support service for at least one of creating, integrating, hosting, maintaining, and deploying computer-readable code in a computer comprising a processor, wherein the processor carries out instructions contained in the code causing the computer to perform the method of claim 1.

11. A computer program product, comprising a computer readable hardware storage device storing a computer readable program code, said computer readable program code comprising an algorithm that when executed by a computer processor of a remote computing system implements a method, said method comprising:

receiving, by said computer processor from a mobile user via a mobile device, description data describing search requirements associated with a requested physical object to be located;

monitoring, by said computer processor in response to a real time search for said requested physical object associated with said description data, current locations of said mobile user;

transmitting, by said computer processor, said request to a plurality of video data retrieval devices, wherein each video data retrieval device is located in a different location;

receiving, by said computer processor in response to said request from said plurality of video data retrieval devices, video data associated with a plurality of physical objects associated with said requested physical object;

calculating, by said computer processor, distances between said current locations of said mobile user and each object location for each physical object of said plurality of physical objects;

calculating, by said computer processor, a relative velocity between said mobile user and each said physical object;

first determining, by said computer processor based on each said relative velocity, that a first group of physical objects of said plurality of physical objects are moving away from said mobile user;

second determining, by said computer processor based on each said relative velocity, that a second group of physical objects of said plurality of physical objects are moving towards said mobile user; and generating, by said computer processor based on said first determining, said second determining, each distance of said distances, and each said relative velocity, recommendations associated with traveling to view each said physical object, wherein said recommendations are presented to said mobile user.

12. The computer program product of claim 11, wherein said generating said recommendations comprises:

calculating an intersection location between said mobile user and each said physical object.

13. The computer program product of claim 12, wherein said generating said recommendations further comprises:

calculating, for said mobile user, a time of arrival to each said intersection location.

14. The computer program product of claim 11, wherein said method further comprises:

receiving, by said computer processor from said mobile user, destination data indicating a requested destination for said mobile user; and identifying, by said computer processor, a current route of travel for said mobile user, wherein said current route of travel is associated with said requested destination, wherein said generating said recommendations are further based on said destination data and said current route of travel.

15. The computer program product of claim 11, wherein said method further comprises:

analyzing, by said computer processor, a historic pattern of said mobile user's movement; and determining, by said computer processor based results of said analyzing, a target location associated with a destination of said mobile user, wherein said generating said recommendations are further based on said target location.

16. The computer program product of claim 11, wherein said generating said recommendations comprises:

determining a route change for said mobile user.

17. The computer program product of claim 11, wherein said generating said recommendations comprises:

determining a change to a speed of travel for said mobile user.

18. A computer system comprising a computer processor coupled to a computer-readable memory unit, said memory unit comprising instructions that when executed by the computer processor of a remote computing system implements a method comprising:

receiving, by said computer processor from a mobile user via a mobile device, description data describing search requirements associated with a requested physical object to be located;

monitoring, by said computer processor in response to a real time search for said requested physical object associated with said description data, current locations of said mobile user;

transmitting, by said computer processor, said request to a plurality of video data retrieval devices, wherein each video data retrieval device is located in a different location;

receiving, by said computer processor in response to said request from said plurality of video data retrieval devices, video data associated with a plurality of physical objects associated with said requested physical object;

calculating, by said computer processor, distances between said current locations of said mobile user and each object location for each physical object of said plurality of physical objects;

calculating, by said computer processor, a relative velocity between said mobile user and each said physical object;

first determining, by said computer processor based on each said relative velocity, that a first group of physical objects of said plurality of physical objects are moving away from said mobile user;

second determining, by said computer processor based on each said relative velocity, that a second group of physical objects of said plurality of physical objects are moving towards said mobile user; and generating, by said computer processor based on said first determining, said second determining, each distance of said distances, and each said relative velocity, recommendations associated with traveling to view each said physical object, wherein said recommendations are presented to said mobile user.

* * * * *